W. L. MURPHY.
DISAPPEARING BED.
APPLICATION FILED APR. 25, 1912.
Reissued June 11, 1912. 13,428.
2 SHEETS—SHEET 1.
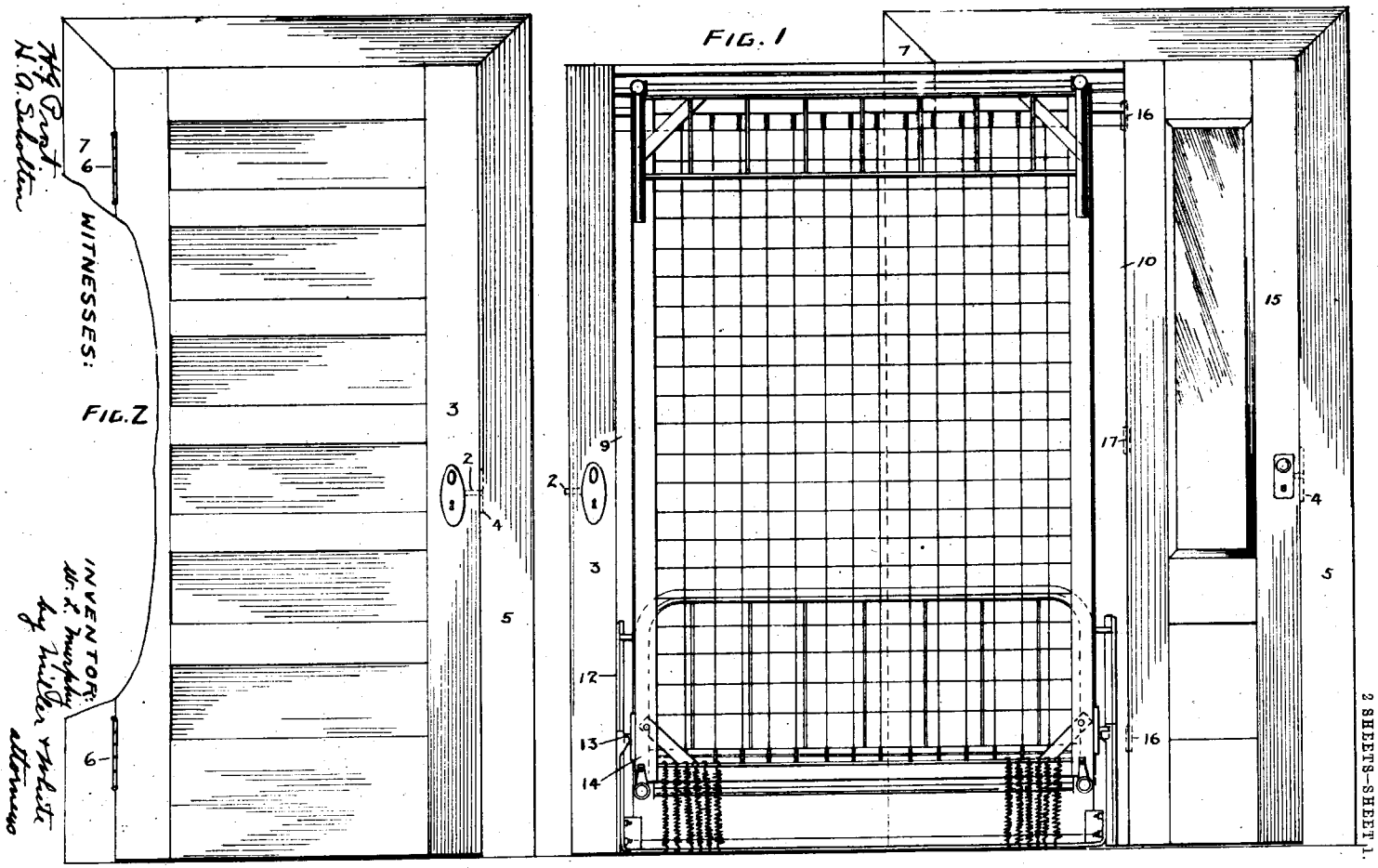

W. L. MURPHY.

DISAPPEARING BED.

APPLICATION FILED APR. 25, 1912.

Reissued June 11, 1912.

13,428.

2 SHEETS—SHEET 2.

WITNESSES

W. J. Prost.

W. A. Scholten

INVENTOR

W. L. Murphy

BY Miller & White

ATTORNEYS.

UNITED STATES PATENT OFFICE.

WILLIAM L. MURPHY, OF SAN FRANCISCO, CALIFORNIA, ASSIGNOR TO MURPHY WALL BED COMPANY, OF SAN FRANCISCO, CALIFORNIA, A CORPORATION OF CALIFORNIA.

DISAPPEARING BED.

13,428. Specification of Reissued Letters Patent. Reissued June 11, 1912.

Original No. 1,007,596, dated October 31, 1911, Serial No. 600,496. Application for reissue filed April 25, 1912. Serial No. 693,266.

*To all whom it may concern:*

Be it known that I, WILLIAM L. MURPHY, a citizen of the United States, residing at San Francisco, in the county of San Francisco and State of California, have invented new and useful Improvements in Disappearing Beds, of which the following is a specification.

The present invention relates to improvements in concealed beds, the object of the invention being to provide an arrangement by which a bed of full size can be concealed in a closet, apartment, or other receptacle, having a door of usual size. I attain this object by pivotally connecting one side of the door with the bed in such a manner that the two parts of the bed on opposite sides of the pivotal connection with the side of the door swing through the opening for the door at different times.

Figure 4:
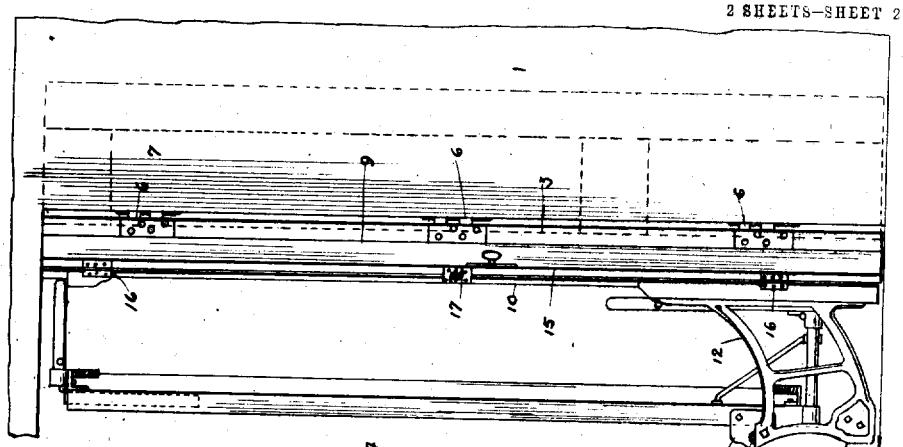
Figure 3:
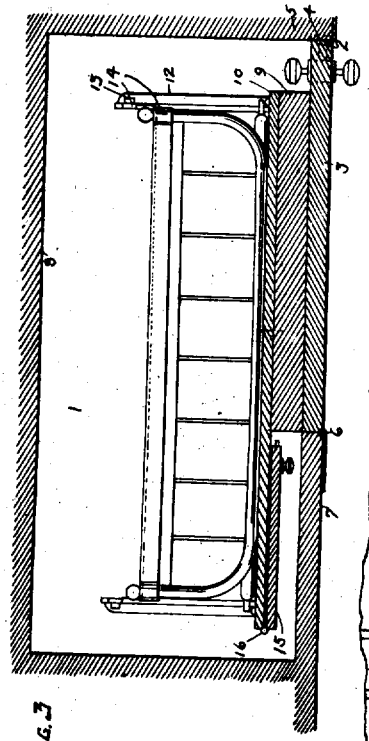
Figure 5:
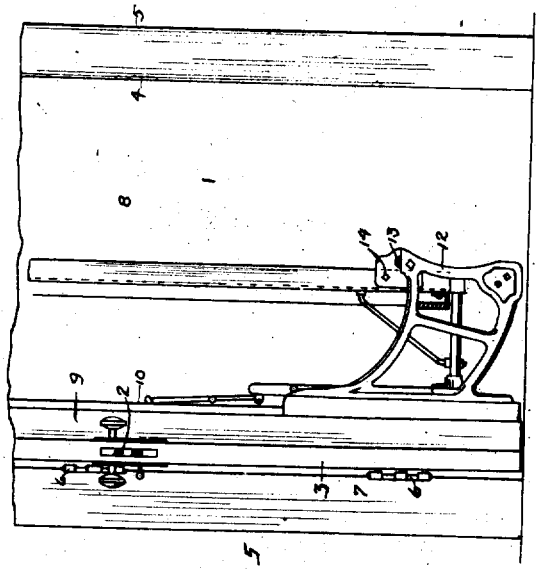
Figure 6:
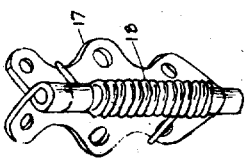

In the accompanying drawings, Figure 1 is a front view of the bed exposed; Fig. 2 is a broken front view of the door of the closet in which the bed may be concealed; Fig. 3 is a sectional view of the bed and closet; Fig. 4 is a rear view of the front wall of said closet showing the bed half drawn out; Fig. 5 is a broken front view of the bed in the same position; Fig. 6 is a perspective view of a spring hinge.

Referring to the drawings, 1 indicates a closet in which the bed is concealed when not in use. The latch 2 of the door 3 of said closet engages a keeper 4 in a side wall 5 thereof. Said door is hinged, as shown at 6, to the front wall 7, at a considerable distance from the other side wall 8. To the back of said door is secured a spacing board 9, to which is secured a bed support 10, said support carrying at the lower end brackets 12, upon which is pivoted, as shown at 13, the bed frame 14. The construction of said bed frame and the mode of securing it to the support form no part of my present invention. Said support extends a considerable distance past the side of the spacing board, as shown in Fig. 3, so as to permit of securing thereto a full-sized bed, although the spacing board is itself narrower than the door, and the door is of the ordinary width. Hence, when said door is swung on its hinges through half a revolution, the extended portion of said bed support extends in front of the greater portion of the doorway. The remainder of the doorway is closed by a narrow supplementary door 15, which is hinged, as shown at 16, 17 to said casing, one, 17, of said hinges being provided as shown in Fig. 6 with a spring 18, which tends to move the door 15 back against the bed support. When the door has been swung outward through half a revolution and the bed exposed, said door 15 is then further swung through half a revolution, and its latch 20 engages the keeper 4 of the main door. It thereby not only closes the opening into the closet by the side of the bed but serves as a brace for the bed in its exposed position. It will be seen that that part of the doorway which, when the bed is drawn out and exposed, is closed by the supplementary door is large enough to permit a person to enter said closet for the purpose of obtaining access to clothes or other articles therein, if it be desired to use said closet also as a receptacle for such articles.

The door of the receptacle is generally of less thickness than the wall of said receptacle, and the spacing device 9 is for the purpose of compensating for this difference in thickness where necessary.

I claim:

1. In combination, a receptacle, a door swinging on a vertical pivot to close the receptacle, a bedstead wider than said door mounted on said door and means on said bedstead for closing said receptacle when the door is open.

2. In combination, a receptacle, a door hinged at one side to the receptacle, a bedstead wider than said door, mounted on said door so that when the door is closed the bedstead extends beyond the hinged side of said door.

3. In combination with a receptacle, a door, hinges whereby said door can swing horizontally to close said receptacle, said receptacle being of greater width than said door, and being extended past the hinges of the door, a spacing device secured to said door, and a bed secured to said spacing device and extending beyond the spacing device and the door, substantially as described.

4. In combination with a door, a bed secured thereon extending past the hinged side of said door, and a supplementary door movably connected to the bed and arranged to completely close the doorway when the main door is fully opened, substantially as described.

5. In combination with a door, a bed secured thereon, extending past the hinged side of said door, and a supplementary door movably connected to the bed and arranged to completely close the doorway when the main door is fully opened, and having a latch adapted to engage the keeper of the latch of the main door, substantially as described.

6. In combination with a receptacle having a hinged door, said receptacle being of greater width than said door, and being extended past the hinges of said door, a bed secured to said door and having a portion arranged when the door is closed to enter said extended portion of the receptacle, and a supplementary door movably connected to the bed and arranged to completely close the doorway, substantially as described.

7. In combination with a receptacle having a hinged door, said receptacle being of greater width than said door, and being extended past the hinges of said door, a bed secured to said door and having a portion arranged when the door is closed to enter said extended portion of the receptacle, and a supplementary door movably connected to the bed and arranged, when the main door is fully opened, to completely close the doorway, and having a latch adapted to engage the keeper of the latch of the main door, substantially as described.

8. In combination with a door, a bed secured thereon, extending past the hinged side of said door, and a supplementary door movably connected to the bed and arranged when the main door is fully opened to completely close the doorway, and a spring for normally opening said supplementary door, substantially as described.

9. In combination with a wall having an opening, a bed of greater width than said opening, and pivotal means for connecting the wall, at one vertical side of said opening, and the bed whereby, in the horizontal movement of the bed through said opening on said pivotal connections, different portions of the bed swing therethrough at different times.

10. In combination with a wall having an opening, a bed of greater width than said opening, and pivotal means for connecting the wall, at one vertical side of said opening, and the bed intermediate of the sides thereof.

11. In combination with a wall having an opening, a bed of greater width than said opening, and pivotal means for connecting the wall, at one vertical side of said opening, and the bed intermediate of the sides thereof, said pivotal means including a door rigidly secured to the bed, and adapted to close the opening.

12. In combination with a wall having an opening, a bed of greater width than said opening, and pivotal means for connecting the wall, at one vertical side of said opening, and the bed intermediate of the sides thereof, said pivotal means including a door and a spacing device rigidly secured to the door and bed, the door being adapted to close the opening.

13. In combination with a wall having an opening, a bed pivoted on a vertical axis adjacent to one side of said opening and intermediate between the sides of the bed.

14. In combination with a wall having an opening, a bed comprising a part pivoted on a vertical axis adjacent to one side of said opening and intermediate between the sides of the bed, and a folding bed frame adapted to swing upward upon a horizontal axis.

WILLIAM L. MURPHY.

Witnesses:
H. G. Prost,
P. S. Pidwell.